(12) United States Patent
Min (10) Patent No.: US 7,720,816 B2
(45) Date of Patent: May 18, 2010

(54) SYSTEM AND METHOD FOR MANAGING LOG INFORMATION

(75) Inventor: Kyung-sub Min, Seoul (KR)

(73) Assignee: Samsung Electronics Co., Ltd. (KR)

( * ) Notice: Subject to any disclaimer, the term of this patent is extended or adjusted under 35 U.S.C. 154(b) by 365 days.

(21) Appl. No.: 11/649,764

(22) Filed: Jan. 5, 2007

(65) Prior Publication Data

US 2007/0156782 A1    Jul. 5, 2007

(30) Foreign Application Priority Data

Jan. 5, 2006    (KR)    ............ 10-2006-0001388

(51) Int. Cl.
*G06F 7/00* (2006.01)
*G06F 17/00* (2006.01)
(52) U.S. Cl. .............. 707/644; 707/648; 707/672
(58) Field of Classification Search ................ 707/8, 707/202, 204, 999.008, 999.202, 999.204
See application file for complete search history.

(56) References Cited

U.S. PATENT DOCUMENTS

| | | | | |
|---|---|---|---|---|
| 4,945,474 A | * | 7/1990 | Elliott et al. ............... 714/16 |
| 4,969,088 A | * | 11/1990 | McAuliffe et al. ......... 709/241 |
| 5,455,946 A | * | 10/1995 | Mohan et al. .............. 707/202 |
| 5,465,337 A | * | 11/1995 | Kong ......................... 711/207 |
| 5,778,388 A | * | 7/1998 | Kawamura et al. ......... 707/203 |
| 6,108,671 A | * | 8/2000 | Ogawa ....................... 707/204 |
| 6,341,317 B1 | * | 1/2002 | D'Errico et al. ............ 710/15 |
| 6,449,062 B1 | * | 9/2002 | Endo ......................... 358/400 |
| 7,493,304 B2 | * | 2/2009 | Day et al. ..................... 707/2 |
| 2002/0124130 A1 | * | 9/2002 | Iida et al. ................... 711/103 |
| 2006/0101081 A1 | * | 5/2006 | Lin et al. .................... 707/200 |
| 2006/0168128 A1 | * | 7/2006 | Sistla et al. ................. 709/219 |

FOREIGN PATENT DOCUMENTS

| | | |
|---|---|---|
| JP | 3-010343 A | 1/1991 |
| JP | 2004-199420 A | 7/2004 |
| KR | 10-2005-0052016 A | 6/2005 |

* cited by examiner

*Primary Examiner*—Jean B. Fleurantin
*Assistant Examiner*—Phong Nguyen
(74) *Attorney, Agent, or Firm*—Sughrue Mion, PLLC

(57) ABSTRACT

A system and a method for managing log information. The system includes an input module that receives log information on a data renewal and a control module that stores a renewed data image based on the received log information when a page area where the renewed data exists is a hotspot, wherein the control module manages a hotspot control list (HSCL) including hotspot managing information and address information on a storage area in which the renewed data image is stored.

20 Claims, 8 Drawing Sheets

SYSTEM AND METHOD FOR MANAGING LOG INFORMATION

CROSS-REFERENCE TO RELATED APPLICATION

This application claims priority from Korean Patent Application No. 10-2006-0001388 filed on Jan. 5, 2006, in the Korean Intellectual Property Office, the disclosure of which is incorporated herein in its entirety by reference.

BACKGROUND OF THE INVENTION

1. Field of the Invention

Apparatuses and methods consistent with the present invention relate to log information management in a database management system, and more particularly, to separately managing information on a data area where a lot of renewals are generated, thereby minimizing repetitively generated log information.

2. Description of the Related Art

A "log" or "logging" in a database management system means that data is stored before being modified in order to prevent the data, being modified by an operation of an application program, from not having a normal value due to a system error or user's carelessness.

The database management system can restore the data, being controlled by an abnormally completed application, to a normal status by the above-described logging.

Figure 1:
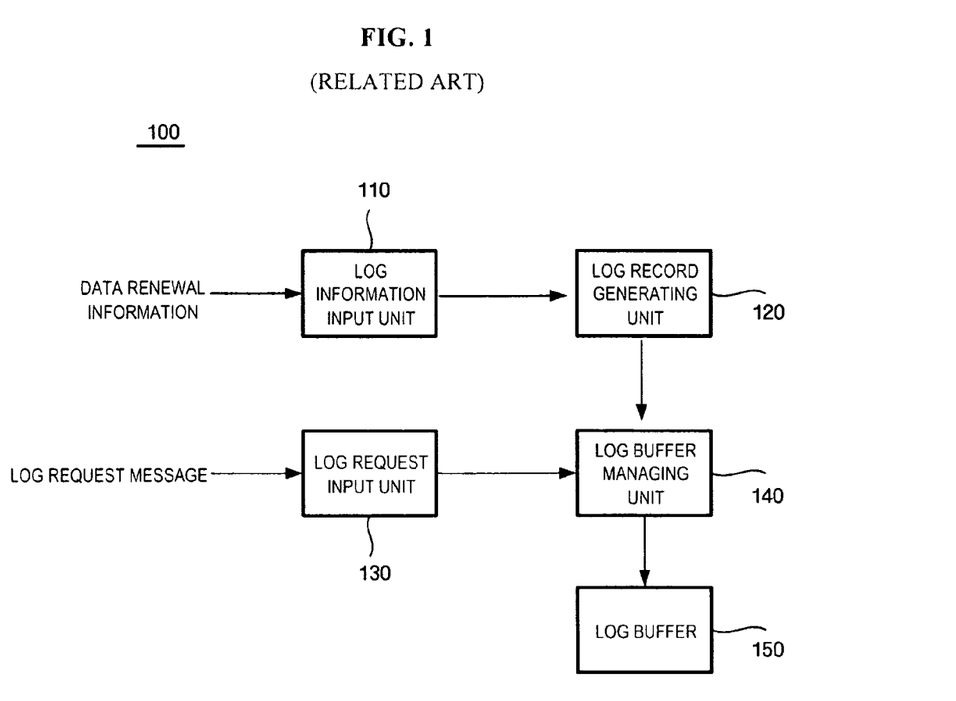
FIG. 1 illustrates a related art logging system for performing a logging operation.

FIG. 1 illustrates a related art logging system for performing a logging.

Referring to FIG. 1, a related art logging system 100, referred to as a "log manager", includes a log information input unit 110, a log record generating unit 120, a log request input unit 130, a log buffer managing unit 140 and a log buffer 150.

The related art logging system 100 receives, via the log information input unit 110, information on a data renewal performed in another program module within a system to which the logging system belongs.

The log record generating unit 120 generates a log record by setting required information additionally. The generated log record is recorded in the log buffer 150 via the log buffer managing unit 140. In this case, the log records are recorded in the order in which they were generated.

The log request input unit of the logging system 100 receives a log request message (e.g., transaction completion) by other modules of the system and transmits it to the log buffer managing unit 140. The log buffer managing unit 140 records the log records stored in the log buffer 150 in a log file based on the transmitted log request message.

Based on the log records recorded in the log file and the log buffer 150, data can be safely restored in a case of an abnormal completion of an application or a system error.

Figure 2:
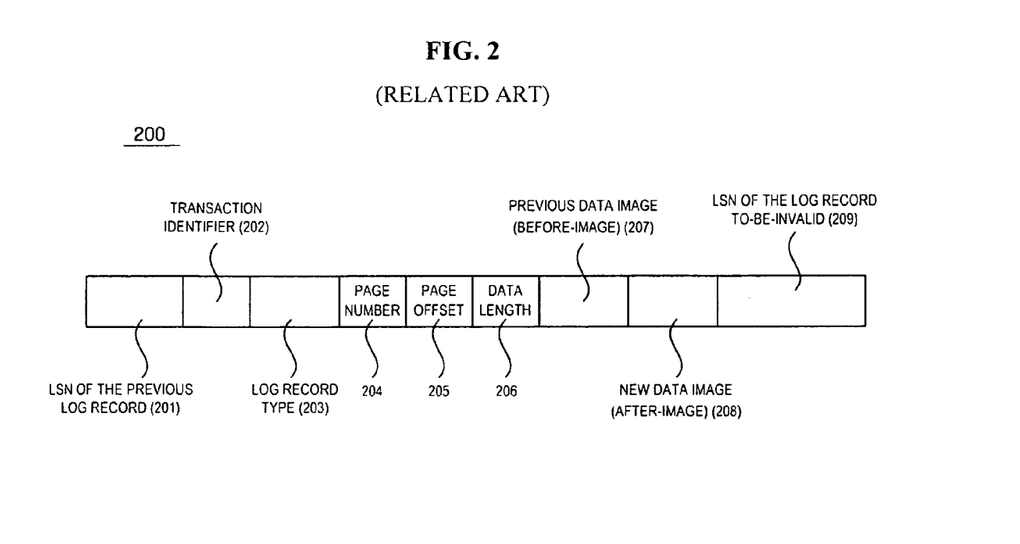
FIG. 2 illustrates a configuration of a related art log record.

The log records maintain at least important information (or data) for restoring the data to an original status. FIG. 2 illustrates a configuration of a related art log record.

Referring to FIG. 2, a log record 200 includes a log sequence number (LSN) field of a previous log record 201, a transaction identifier field 202, a log record type filed 203, a page number filed 204, a page offset field 205, a data length field 206, a previous data image field 207, a new data image field 208, and a LSN field of a log record to-be-invalid 209. Hereinafter, the above information included in the log record 200 is referred to as "log information".

The LSN field 201 of the previous log record displays numbers for identifying the recorded log record.

The transaction identifier field 202 displays an identifier of a transaction performing a logging.

The log record type field 203, as a field which displays the type of a log record, has different types for each of generated operations such as "renewal", "transaction start" or "transaction completion".

The page number field 204 displays the number of a page in which renewed data is stored, when a renewal occurs. The page offset filed 205 displays a start position in the page where the renewed data is stored, when the renewal occurs. The data length field 206 displays a size of the data to be renewed.

The previous data image field 207 displays a previous data value before the renewal is performed and the new data image field 208 displays a modified data value after the renewal is performed.

The LSN field 209 of the log record to-be-invalid displays numbers for identifying the log record to be restored.

A configuration of the log record 200 illustrated in FIG. 2 may be different depending upon a system using the logging, but its basic configuration and meaning are similar.

Figure 3A:
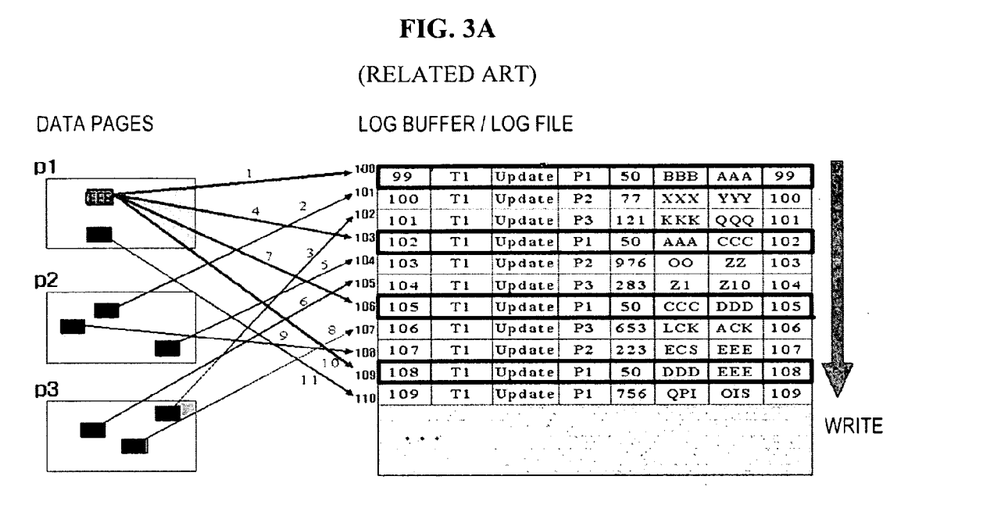
FIGS. 3A and 3B illustrate a related art process of a logging operation and a transaction cancellation.
Figure 3B:
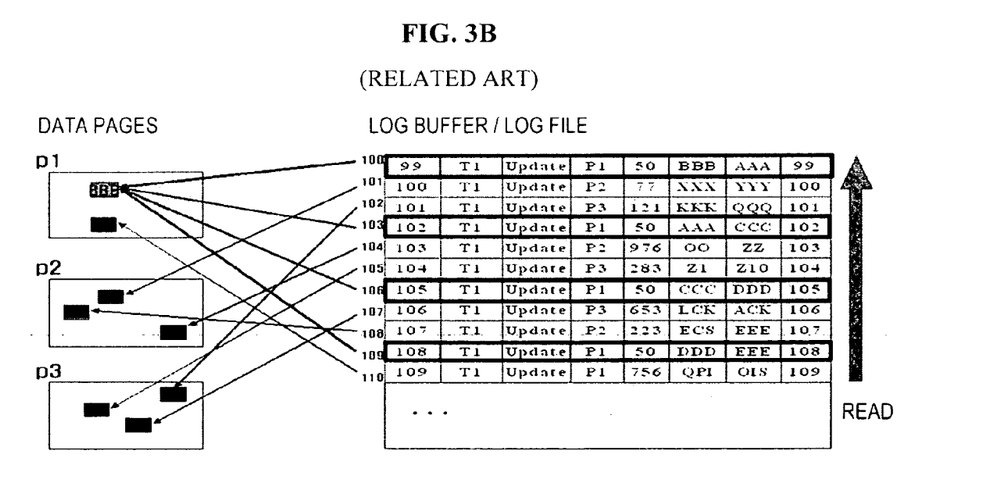

FIGS. 3A and 3B illustrate a related art process of a logging operation and a transaction cancellation. A configuration of a log record of a log buffer or a log file, illustrated in FIGS. 3A and 3B, is similar to the configuration of the log record illustrated in FIG. 2. The configuration of the log record illustrated in FIGS. 3A and 3B does not include the data length field 206 of the configuration of the log record illustrated in FIG. 2, and the number marked at each log record corresponds to an identification number for identifying each log record.

To perform a logging operation, other modules transmit a before-image and an after-image, as a result of a renewal generated in a transaction, to the log information input unit 110 of the logging system 100.

The log record generating unit 120 generates a log record based on information on the two received data. The log buffer managing unit 140 records the generated log record in the log buffer 150.

All of the generated log records are successively recorded and an LSN value of the recorded log record is allocated in ascending order. The log records recorded in the log buffer 150 are recorded in the log file when the log buffer 150 is full or a "disk writing request" for the log record occurs.

As described above, all of the log records of a renewal generated by other modules are successively recorded. The logging system 100 performs a cancellation by reading the log file when a request to cancel an application program or to restore a system error.

Referring to FIG. 3A, a process of performing a logging operation will be described, which assumes that a transaction T1 performs a renewal of three data pages P1, P2, and P3.

Whenever a renewal is generated for each data page, a corresponding area in the data page is modified to a new value. A first log record displays that "BBB" recorded at 50 bite position in the data page P1 is modified to "AAA".

Each of the following log records display that a value stored in a specific offset of the corresponding data page is modified to a new value.

Especially, the data recorded at 50 bite of the data page P1 is modified four times. Whenever a modification occurs, a corresponding log record is generated. The logging system 100 generates log records corresponding to all renewals, and records the log records in the log buffer 150 and a log file successively.

FIG. 3 illustrates a process of canceling a transaction. When a renewal illustrated in FIG. 3A occurs, it is assumed that a transaction T1 is not completed normally.

To restore all data that are modified by the transaction T1 into original normal values, all log records of the transaction T1 recorded in the log buffer 150 or the log file are read in reverse order. By doing so, a data value in the corresponding data page is modified into a before-image recorded in each log record. Accordingly, all areas renewed in the corresponding data pages P1, P2, and P3 are restored to previous values before the transaction T1 is performed. In this process, the value at 50 bite of the data page P1 is modified from "EEE" to "BBB" that is the previous value before the four renewals.

As described above, the logging system 100 generates log records and records them successively in the log of all renewals performed by other modules. Accordingly, the logging system 100 repetitively generates new log records of a specific data page where frequent modifications occur by the application or a specific area in the data page. Hereinafter, the data area where a lot of modifications occur is referred to as a "hotspot".

A hotspot may appear throughout a lot of areas in a system and its size may be greatly various. Accordingly, the number of the log records of the hotspot generated while one operation (transaction) is performed may greatly increase, which may enlarge the log size while the system is operated and a function as a real-time system deteriorates because the log records are continuously generated and page inputs and outputs increase.

In cancellation of an application or system restoration, run-time and restoration functions of the system may deteriorate because all log records generated for the hotspot are used to restore data to an original status.

In the process illustrated in FIG. 3B, for example, the operations with respect to three log records identified as 109, 106, and 103 are unnecessary in order to restore a value at 50 bite of the data page P1.

As various embedded systems such as digital devices are introduced, a safe management of user data stored in the embedded systems is highly required. The data stored in a system may not be maintained as a normal value due to user's carelessness, an abnormal operation of an application program, or a power interruption. Accordingly, a data restoring system to maintain normal data safely is a greatly important system component. However, it is difficult that a logging-based data restoring system ensures a response time and function required in an embedded system in which resources are limited.

Accordingly, it is needed to improve the relate art method of managing log information in the logging-based data restoring system.

SUMMARY OF THE INVENTION

The present invention provides a system and method for minimizing log information that is repetitively generated with respect to a hotspot.

The present invention also provides a log information management system and a method for improving a data restoring function by separately managing information on a hotspot.

According to an aspect of the present invention, there is provided a log information management system including an input module that receives log information on a data renewal; and a control module that stores a renewed data image based on the log information if a page area where the renewed data exists is a hotspot, wherein the control module manages a hotspot control list (HSCL) including hotspot management information and address information on a storage area in which the renewed data image is stored.

According to another aspect of the present invention, there is provided a log information management system including an input module that receives a message requesting a transaction completion; a control module that provides hotspot management information with respect to a hotspot if the hotspot is registered in an HSCL; a log record generating module that generates a log record that includes a data image renewed based on the hotspot management information and a log record that represents a transaction completion; and a log buffer management module that records the log record.

According to a further another aspect of the present invention, there is provided a log information management system including an input module that receives a message requesting a transaction cancellation; a control module that deletes hotspot management information with respect to a hotspot if the hotspot is registered in an HSCL; a log record generating module that generates a log record that represents the transaction cancellation; and a log buffer management module that records the log record.

According to still another aspect of the present invention, there is provided a log information management system including: receiving log information on a data renewal; and storing a renewed data image based on the log information when a page area if the renewed data exists is a hotspot, wherein address information on a storage area in which the renewed data image is stored is recorded in an HSCL which includes hotspot management information.

According to further another aspect of the present invention, there is provided a log information management system including: receiving a message requesting a transaction completion; providing hotspot management information with respect to a hotspot if the hotspot is registered in an HSCL; generating a log record that includes a data image renewed based on the hotspot management information and a log record that represents the transaction completion; and recording the log record.

According to further another aspect of the present invention, there is provided a log information management system including: receiving a message requesting a transaction cancellation; deleting hotspot management information with respect to a hotspot if the hotspot is registered in an HSCL; generating a log record that represents the transaction cancellation; and recording the log record.

BRIEF DESCRIPTION OF THE DRAWINGS

The above and other aspects of the present invention will become more apparent by describing in detail preferred embodiments thereof with reference to the attached drawings, in which.

DETAILED DESCRIPTION OF EXEMPLARY EMBODIMENTS

Aspects of the present invention and methods of accomplishing the same may be understood more readily by reference to the following detailed description of exemplary embodiments and the accompanying drawings. The aspects of the present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims.

The present invention is described hereinafter with reference to a block diagram or flowchart illustrations of a system and a method for managing log information according to exemplary embodiments of the invention. It should be understood that each block of the flowchart and combinations of blocks in the flowchart can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus creates ways for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instructions that implement the function specified in the flowchart block or blocks.

The computer program instructions may also be loaded onto a computer or other programmable data processing apparatus to cause a series of operations to be performed on the computer or other programmable apparatus to produce a computer implemented process such that the instructions executed on the computer or other programmable apparatus provide operations for implementing the functions specified in the flowchart block or blocks.

And, each block of the flowchart illustrations may represent a module, segment, or portion of code which includes one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in reverse order, depending upon the functionality involved.

Figure 4:
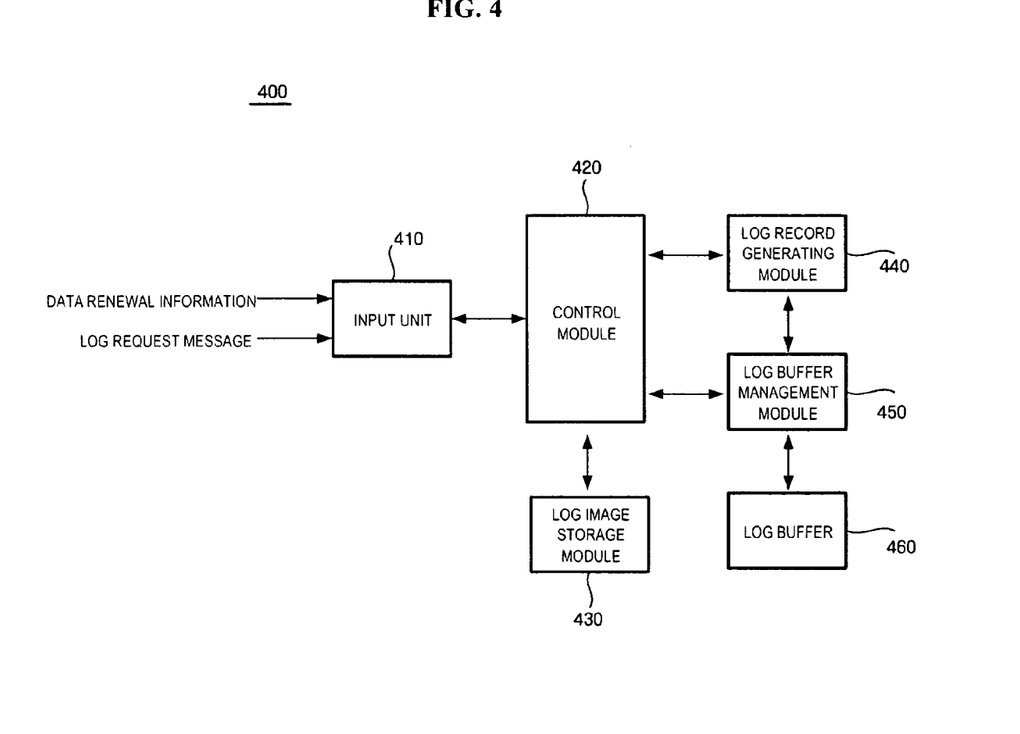
FIG. 4 illustrates a log information management system according to an exemplary embodiment of the present invention.

FIG. 4 illustrates a log information management system according to an exemplary embodiment of the present invention.

Referring to FIG. 4, a log information management system includes an input unit 410, a control module 420, a log image storage module 430, a log record generating module 440, a log buffer management module 450, and a log buffer 460.

The term "module," as used herein, refers to, but is not limited to, a software or hardware component, such as a Field Programmable Gate Array (FPGA) or an Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, components and modules may be implemented so as to reproduce one or more CPUs within a device or a secure multimedia card.

The input module 410 receives information on a data renewal or a log request message by other modules in a system to which the log information management system 400 belongs. As an example of the log request message, there are a transaction completion, a transaction cancellation, and a data restoration.

Figure 5:
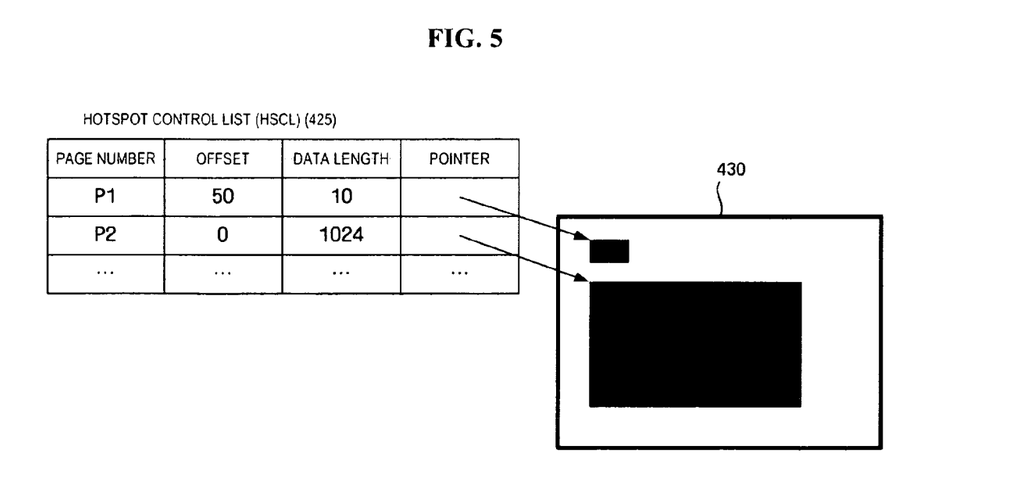
FIG. 5 is table illustrating a hotspot control list according to an exemplary embodiment of the present invention.

The control module 420 manages a hotspot control list (HSCL) 425 illustrated in FIG. 5 separately in order to manage a data renewal in a hotspot. The HSCL 425 will be described later. The control module 420 performs management of the hotspot in conjunction with the log record generating module 440 and the log buffer management module 450.

The log image storage module 430 stores a log image of the hotspot.

When data renewal information is input by other modules via the input module 410, the control module 420 verifies whether the renewed data is located in the hotspot. If the renewed data is located in the hotspot, the input data renewal information is managed by the control module 420. If the renewed is not located in the hotspot, the input data renewal information is transmitted to the log record generating module 440.

The log record generating module 440 generates the log record by setting required information additionally. The generated log record is recorded to the log buffer module 460 via the log buffer management module 450. In this case, the log records are recorded in the order in which they were generated.

When the log request message is input to the input unit 410 by other modules, a corresponding log record is processed by the control module 420, the log record generating module 440, and the log buffer management module 450 depending upon a message type. Processing the log record according to the log request message will be described with reference to FIGS. 7 and 8.

FIG. 5 is table illustrating a hotspot control list according to an exemplary embodiment of the present invention. The log information management system 400 maintains a data structure of the HSCL 425 managing information on the hotspot.

Referring to FIG. 5, the HSCL 425 has a table format including a page number, an offset, a data length, and a pointer fields.

The page number field shows, when a renewal occurs, the number of a page where the modified data is stored. The offset field shows, when a renewal occurs, the starting position in a page where the modified data is stored. The data length field shows the size of data to be renewed. The pointer field shows the starting address of a memory area where the corresponding data image is stored in the log image storage module 430 in which the renewed data image is recorded.

As described above, the control module 420 becomes easily aware of whether a hotspot is registered via the HSCL 425 or what the current data image stored in the registered hotspot is.

An area corresponding to the size of a renewed image of a random hotspot in the log image storage module 430 is allocated when the hotspot is registered, and returned when the hotspot is deleted in the HSCL 425.

Figure 6:
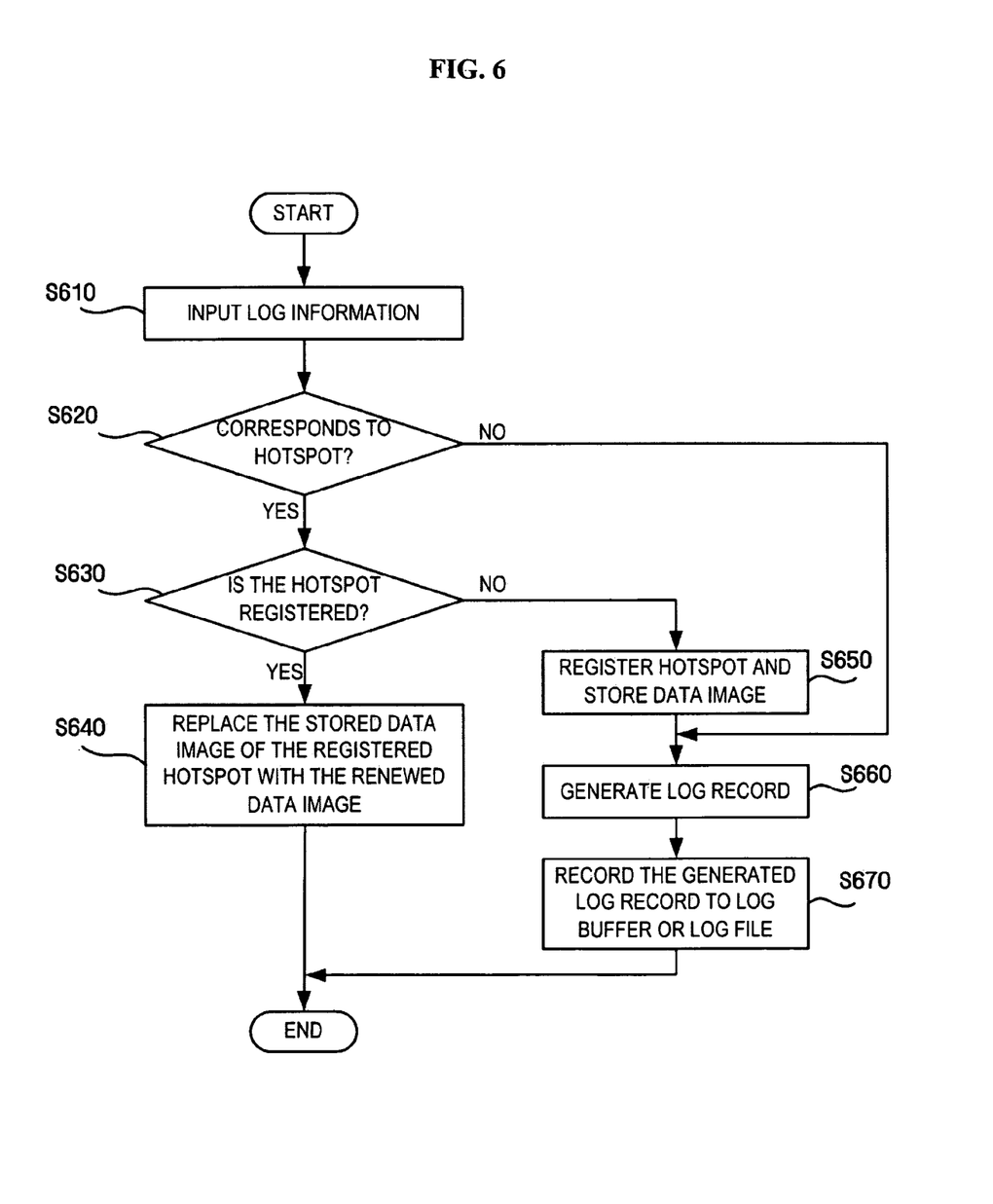
FIG. 6 is a flow chart illustrating a method of managing log information when data is renewed according to an exemplary embodiment of the present invention.

FIG. 6 is a flow chart illustrating a method of managing log information when data is renewed according to an exemplary embodiment of the present invention.

The input unit 410 receives log information such as a data renewal by other modules (S610). The log information includes information on identification, an offset, and the size of a data page to be renewed, a before-image, and an after-image. The log information may include tag information showing whether the area, in the page where the data is renewed, corresponds to a hotspot. The tag information may be actively generated and provided when other modules are operated.

If the tag information is not included in the log information, an area corresponding to a hotspot may be pre-set in a configuration file, which is used when the system, to which the log information management system 400 belongs, is operated. The area corresponding to a hotspot may be also pre-set in the control module 420 of the log information management system 400.

The control module 420 determines whether the page area of the data to be renewed corresponds to a hotspot through the input log information (S620).

If the area does not correspond to a hotspot, the input log information is transmitted to the log record generating module 440. The log record generating module 440 generates a new log record using the transmitted log information and additional information (S660).

The log buffer management module 450 may add the generated log record to the log buffer 460 considering the state of the log buffer 460. If the log buffer 460 has no extra space, log records, which has existed in the log buffer 460, are recorded in a log file and the generated log record is added to the empty log buffer 460 (S670).

If the remaining space of the log buffer 460 is smaller than the size of the generated log record, the log record corresponding to the insufficient size is written to the log file and the remaining record area may be recorded at from the starting position of the empty log buffer 460.

If the area corresponds to a hotspot in S620, the control module 420 determines whether the hotspot is registered in the HSCL 425 S630.

If the hotspot is not registered in the HSCL 425, the control module sets information on the page number, the offset, and the data length in the HSCL 425 based on the input log information. A space corresponding to the data length of the hotspot is allocated to the log image storage module 430 in order to record the after-image (S650).

When a registration at the HSCL 425 is completed, the control module 420 transmits the input log information to the log record generating module 440. The log record generating module 440 generates a log record based on the transmitted log information (S660). In this case, the log record generating module 440 generates the log record which includes only the before-image except the after-image (S660).

The log buffer management module 450 may add the generated log record to the log buffer 460 considering the state of the log buffer 460. If the log buffer 460 has no extra space, log records, which existed in the log buffer 460, are recorded in a log file and the generated log record is added to the empty log buffer 460 (S670).

If the hotspot is already registered in the HSCL 425 in S630, the control module 420 replaces the data image stored in the log image storage module 430 (before-image) with the renewed data image (after-image) (S640). A new log record of the registered hotspot is not generated and the logging is completed.

Figure 7:
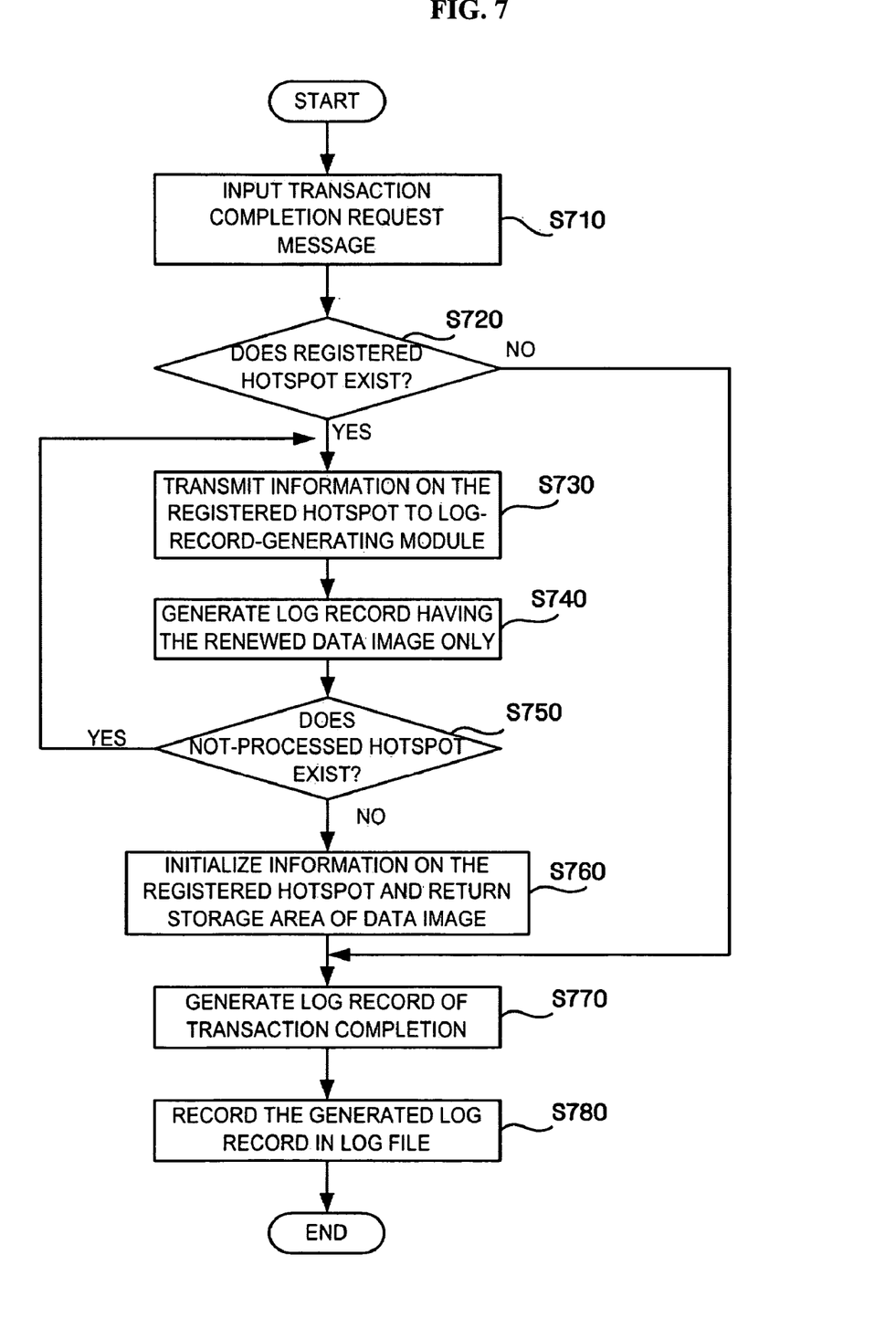
FIG. 7 is a flow chart illustrating a method of managing log information when a transaction completion is requested according to an exemplary embodiment of the present invention.

FIG. 7 is a flow chart illustrating a method of managing log information when a transaction completion is requested according to an exemplary embodiment of the present invention.

When receiving a log request message such as a transaction completion by other modules (S710), the input module 410 transmits the log request message to the control module 420. The control module 420 verifies whether registered hotspots exist in the HSCL 425 (S720). If there is no registered hotspot, the control module 420 requests the log record generating module 440 to generate a log record related to the transaction completion. The log record generating module 440 generates the log record of the transaction completion and transmits it to the log buffer management module 450 (S770). The log buffer management module 450 records all log records, which currently exist in the log buffer 460, in the log file (S780).

If a hotspot is already registered in the HSCL 425 in S720, the control module 420 requests the log record generating module to generate a new log record based on respective hotspot registration information (S730).

The log record generating module 440 generates a log record which includes the after-image except the before-image using the latest data image stored in the image storage module 430 (S740), which is repeated until all hotspot information of the HSCL 425 is processed (S750).

If log records, corresponding to all hotspots registered in the HSCL 425, are generated, the control module 420 deletes information on all hotspots registered in the HSCL 425, initializes the HSCL 425, and returns the storage area of the data image stored in the log image storage module 430 (S760).

The control module 420 requests the log record generating module 440 to generate a transaction completion log record (S770). The log record generating module 440 generates the transaction completion log record, and transmits it to the log buffer management module 450. The log buffer management module 450 records all log records, which currently exist in the log buffer 460, in the log file (S780). Unlike the related art, only one before-image and one after-image are recorded corresponding to all the hotspots.

Figure 8:
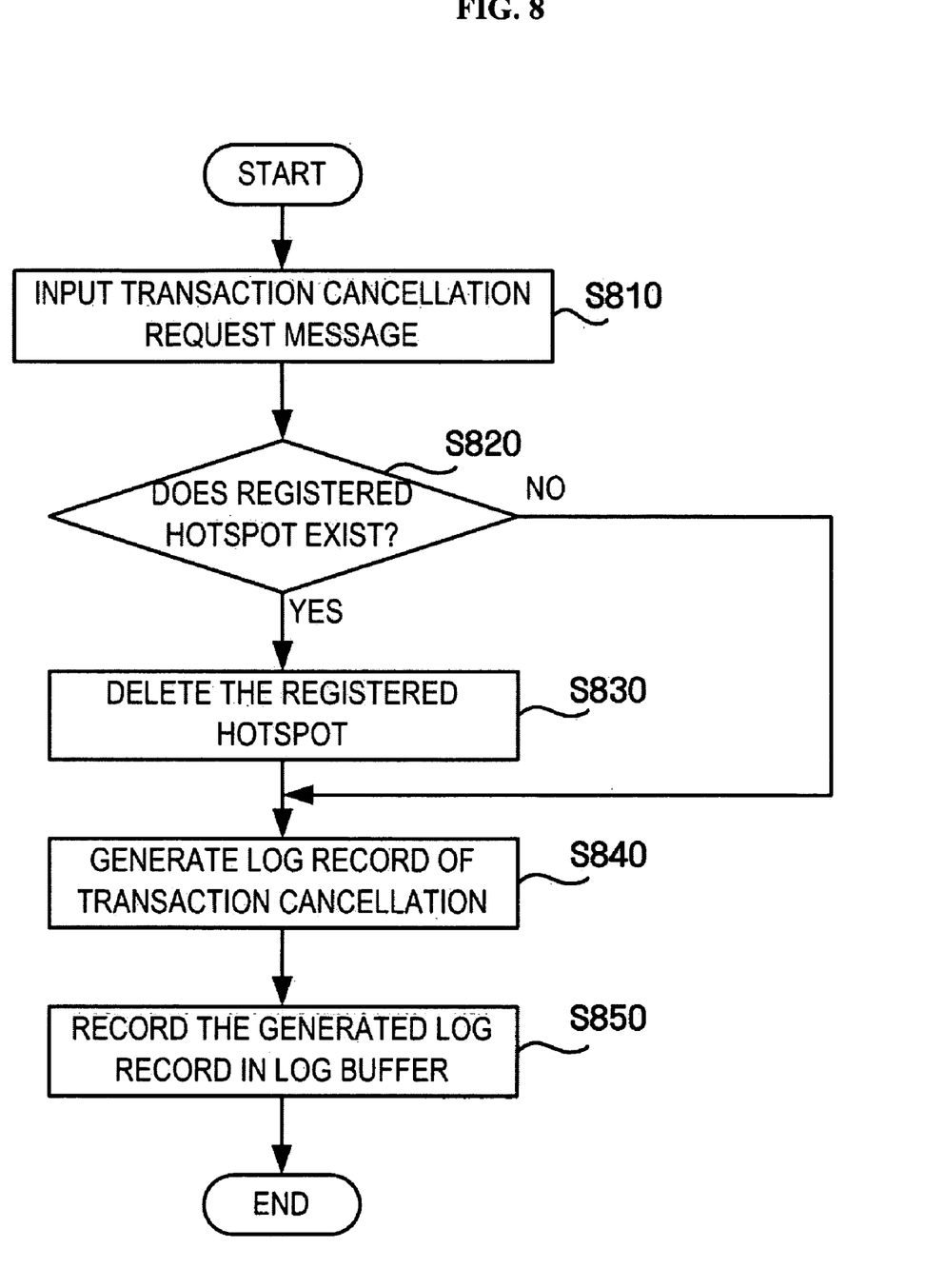
FIG. 8 is a flow chart illustrating a method of managing log information when a transaction completion is requested according to an exemplary embodiment of the present invention.

FIG. 8 is a flow chart illustrating a method of managing log information when a transaction cancellation is requested according to an exemplary embodiment of the present invention.

When receiving a log request message such as a transaction cancellation by other modules (S810), the input module 410 transmits the log request message to the control module 420. The control module 420 verifies whether registered hotspots exist in the HSCL 425 (S820). If there is no registered hotspot, the control module 420 requests the log record generating module 440 to generate a log record related to the transaction cancellation.

The log record generating module 440 generates the log record of the transaction cancellation and transmits it to the log buffer management module 450 (S840). The log buffer management module 450 records the generated log record of the transaction cancellation in the log buffer or the log file (S850).

If a registered hotspot exists in the HSCL 425 in S820, the control module 420 deletes information on all of the registered hotspots, and initializes the HSCL 425 (S830).

The control module 420 requests the log record generating module 440 to generate a transaction cancellation log record.

The log record generating module 440 generates the transaction cancellation log record, and transmits it to the log buffer management module 450 (S840). The log buffer management module 450 records the generated log record of the transaction cancellation in the log buffer or the log file (S850).

Since it is not needed to consider all log information on the hotspots by performing the above transaction cancellation, the present invention can efficiently perform the transaction cancellation unlike the conventional art.

Figure 9:
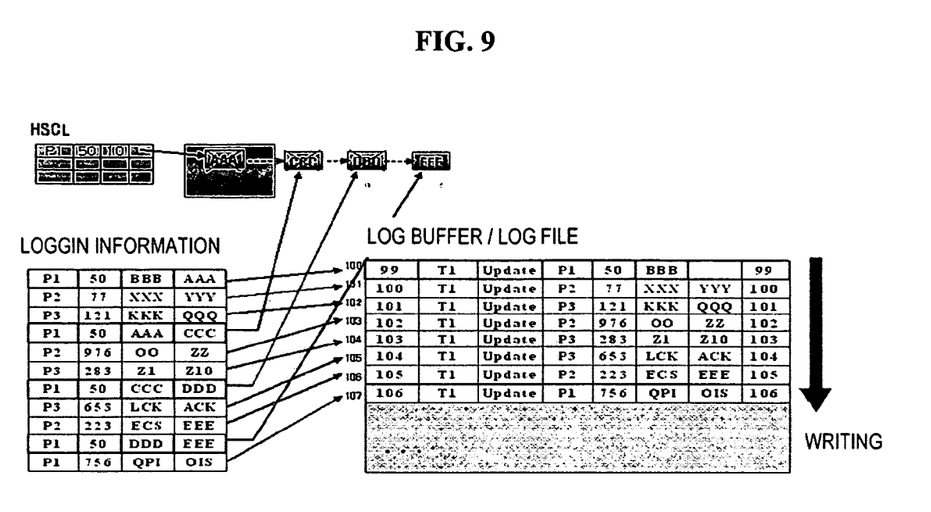
FIG. 9 is a flow chart illustrating a method of managing log information when data is renewed according to an exemplary embodiment of the present invention.

FIG. 9 is a flow chart illustrating a method of managing log information when data is renewed according to an exemplary embodiment of the present invention.

Referring to FIG. 9, it is assumed that data, which is stored at offset 50 of the data page P1, is registered in the HSCL. When log information is successively input as illustrated in FIG. 9, the log information management system registers the first input hotspot renewal information in the HSCL, and generates a log record which includes only a previous data image (before-image, "BBB"). In case of hotspot renewal information ("CCC", "DDD", and "EEE"), however, the log information management system continuously modifies a new data image (after-image) stored in the HSCL and does not generate a log record.

Figure 10:
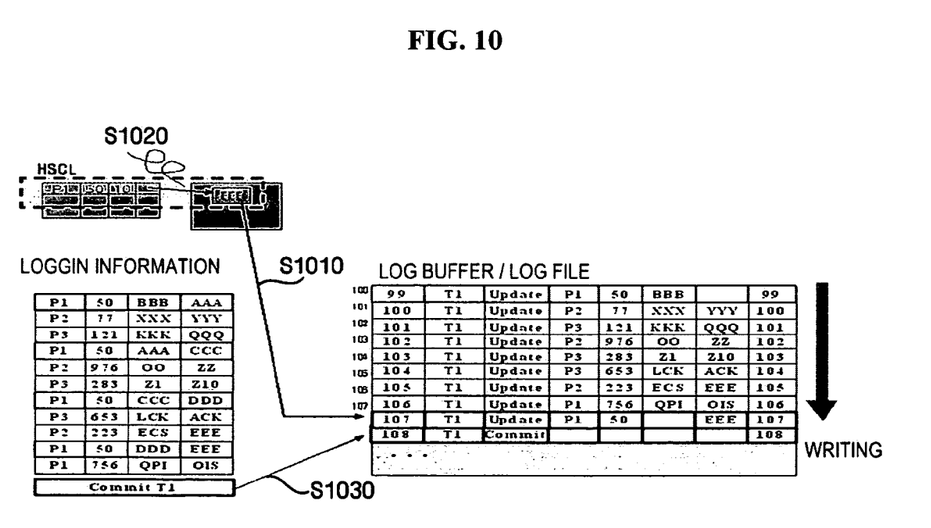
FIG. 10 is a flow chart illustrating a method of managing log information when a transaction completion is requested according to an exemplary embodiment of the present invention.

FIG. 10 is a flow chart illustrating a method of managing log information when a transaction completion is requested according to an exemplary embodiment of the present invention.

When a transaction completion request is input after the renewal is performed as illustrated in FIG. 9, the log information management system generates a log record, which includes the after-image ("EEE" of FIG. 10), based on the registered hot spot (S1010), and deletes the hotspot information registered in the HSCL (S1020). The generated record does not include the before-image. And the log information management system generates a transaction completion log record, and records it in the log buffer (S1030) and content of the log buffer in the log file.

Figure 11:
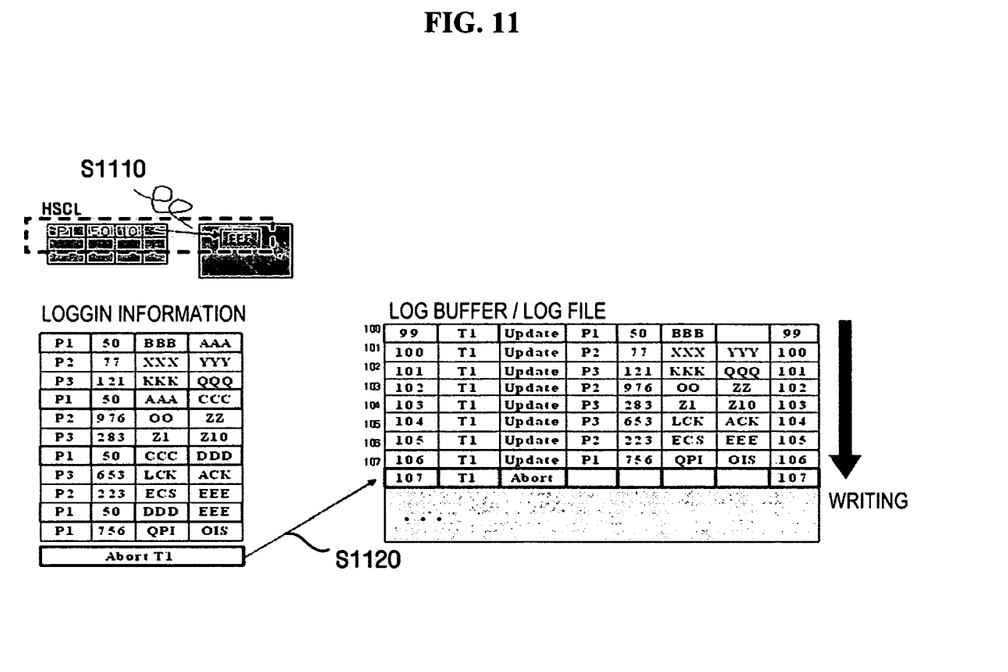
FIG. 11 is a flow chart illustrating a method of managing log information when a transaction completion is requested according to an exemplary embodiment of the present invention.

FIG. 11 is a flow chart illustrating a method of managing log information when a transaction cancellation is requested according to an exemplary embodiment of the present invention.

When the a transaction cancellation request is input after the renewal is performed as illustrated in FIG. 9, the log information management system deletes all hotspots registered in the HSCL (S1110). The log information management system generates a transaction cancellation record, and records it in the log buffer (S1120). A log record of the hotspots is not generated additionally.

According to the exemplary embodiments of the present invention, the log records of all of the registered hotspots include only one before-image and one after-image.

As described above, the log information can be efficiently managed according to the exemplary embodiments of the present invention.

Since the size of the log information can be reduced, the log information can be more efficiently managed in a system environment in which resources are limited.

Exemplary embodiments of the aspects of the present invention have been described with respect to the accompanying drawings. However, it will be understood by those of ordinary skill in the art that various replacements, modifications and modifies in form and details may be made therein without departing from the spirit and scope of the present invention as defined by the following claims. Therefore, it is to be appreciated that the above described exemplary embodiments are for purposes of illustration only and are not to be construed as a limitation of the invention.

What is claimed is:

1. A log information management apparatus comprising:
   an input module that receives log information on a data renewal;
   a control module that stores a renewed data image based on the log information if a page area where the renewed data exists is a hotspot, and requests for generating a log record based on the log information if the page area is not a hotspot; and
   a log buffer management module that records the log record in a log buffer,
   wherein the control module manages a hotspot control list (HSCL) comprising hotspot management information and address information on a storage area in which the renewed data image is stored, and at least one of the modules is hardware,
   wherein the hotspot is a specific data page where frequent modifications occur by an application.

2. The apparatus of claim 1, wherein if the hotspot is already registered in the HSCL, the control module replaces a pre-stored data image of the hotspot with the renewed data image.

3. The apparatus of claim 1, wherein if the hotspot is not registered in the HSCL, the control module registers the hotspot in the HSCL, and stores the renewed data image in the storage area.

4. The apparatus of claim 3 further comprising:
   a log record generating module that generates a log record that comprises a previous data value before the data renewal is performed, and does not include the renewed data image based on the log information.

5. The apparatus of claim 1, wherein the hotspot management information comprises information on at least one of a page, a page offset, and a data length.

6. The apparatus of claim 1, wherein the log information comprises information on at least one of a transaction identifier, a log record type, a page, a page offset, a data length, a previous data image, a renewed data image.

7. A log information management apparatus comprising:
   an input module that receives a message requesting a transaction completion;
   a control module that provides hotspot management information with respect to a hotspot if the hotspot is registered in a hotspot control list (HSCL), and requests for generating a log record related to the transaction completion if the hotspot is not registered in the hotspot control list;

a log record generating module that generates a log record comprising a data image renewed based on the hotspot management information and a log record representing the transaction completion; and a log buffer management module that records the log record, and at least one of the modules is a hardware, wherein the hotspot is a specific data page where frequent modifications occur by an application, and wherein the control module manages the HSCL comprising the hotspot management information and address information on a storage area in which a renewed data image is stored.

8. The apparatus of claim 7, wherein the hotspot management information comprises information on at least one of a page, a page offset, and a data length.

9. A log information management apparatus comprising:

an input module that receives a message requesting a transaction cancellation;

a control module that deletes hotspot management information with respect to a hotspot if the hotspot is registered in a hotspot control list (HSCL), and requests generation of a log record related to the transaction cancellation;

a log record generating module that generates a log record representing the transaction cancellation; and a log buffer management module that records the log record, and at least one of the modules is hardware, wherein the hotspot is a specific data page where frequent modifications occur by an application, and wherein the control module manages the HSCL comprising the hotspot management information and address information on a storage area in which a renewed data image is stored.

10. The apparatus of claim 9, wherein the hotspot management information comprises information on at least one of a page, a page offset, and a data length.

11. A log information management method comprising:

receiving, by a log information management apparatus, log information on a data renewal;

storing a renewed data image based on the log information if a page area where the renewed data exists is a hotspot;

requesting for generating a log record based on the log information if the page area is not a hot spot; and recording the log record in a log buffer, wherein address information on a storage area in which the renewed data image is stored is recorded in a hotspot control list (HSCL) which comprises hotspot management information, wherein the hotspot is a specific data page where frequent modifications occur by an application.

12. The method of claim 11, wherein if the hotspot is already registered in the HSCL, wherein the storing the renewed data image based on the log information comprises replacing a pre-stored data image of the hotspot with the renewed data image.

13. The method of claim 11, wherein if the hotspot is not registered in the HSCL, the storing the renewed data image based on the log information comprises registering the hotspot in the HSCL and storing the renewed data image in the storage area.

14. The method of claim 13 further comprising:

generating a log record that comprises a previous data value before the data renewal is performed, and does not include the renewed data image based on the log information.

15. The method of claim 11, wherein the hotspot management information comprises information on at least one of a page, a page offset, and a data length.

16. The method of claim 11, wherein the log information includes information on at least one of a transaction identifier, a log record type, a page, a page offset, a data length, a previous data image, a renewed data image.

17. A log information management method comprising:

receiving, by a log information management apparatus, a message requesting a transaction completion;

providing hotspot management information with respect to a hotspot if the hotspot is registered in a hotspot control list (HSCL);

requesting generation of a log record related to the transaction completion if the hotspot is not registered in the hotspot control list;

generating a log record comprising a data image renewed based on the hotspot management information and a log record representing the transaction completion; and recording the log record, wherein address information on a storage area in which a renewed data image is stored is recorded in the HSCL which comprises the hotpots management information, wherein the hotspot is a specific data page where frequent modifications occur by an application.

18. The method of claim 17, wherein the hotspot management information comprises information on at least one of a page, a page offset, and a data length.

19. A log information management method comprising:

receiving, by a log information management apparatus, a message requesting a transaction cancellation;

deleting hotspot management information with respect to a hotspot if the hotspot is registered in a hotspot control list (HSCL);

requesting generation of a log record representing the transaction cancellation if the hotspot is not registered in the hotspot control list;

generating a log record representing the transaction cancellation; and recording the log record, wherein address information on a storage area in which a renewed data image is stored is recorded in the HSCL which comprises the hotspots management information, wherein the hotspot is a specific data page where frequent modifications occur by an application.

20. The method of claim 19, wherein the hotspot management information comprises information on at least one of a page, a page offset, and a data length.

* * * * *